United States Patent
Navarrete et al.

(10) Patent No.: US 12,112,383 B2
(45) Date of Patent: Oct. 8, 2024

(54) METHODS FOR DETERMINING IMAGE CONTENT WHEN GENERATING A PROPERTY LOSS CLAIM THROUGH PREDICTIVE ANALYTICS

(71) Applicant: Mitchell International, Inc., San Diego, CA (US)

(72) Inventors: Jonathan Navarrete, San Diego, CA (US); Olaf Wied, San Diego, CA (US); Norman E. Tyrrell, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 113 days.

(21) Appl. No.: 17/031,728

(22) Filed: Sep. 24, 2020

(65) Prior Publication Data
US 2021/0090180 A1    Mar. 25, 2021

Related U.S. Application Data

(60) Provisional application No. 62/904,976, filed on Sep. 24, 2019.

(51) Int. Cl.
*G06Q 40/08*   (2012.01)
*G06F 16/583*  (2019.01)
*G06F 18/21*   (2023.01)
*G06V 10/764*  (2022.01)
*G06V 10/82*   (2022.01)
*G06V 20/20*   (2022.01)

(52) U.S. Cl.
CPC .......... *G06Q 40/08* (2013.01); *G06F 16/583* (2019.01); *G06F 18/2178* (2023.01); *G06V 10/764* (2022.01); *G06V 10/82* (2022.01); *G06V 20/20* (2022.01)

(58) Field of Classification Search
CPC ................................................ G06Q 40/08
USPC .......................................................... 705/4
See application file for complete search history.

(56) References Cited

U.S. PATENT DOCUMENTS 7,991,715 B2 * 8/2011 Schiff ................ G06Q 30/0273
                                                706/45
10,832,065 B1 * 11/2020 Lambert ............ G06Q 30/0283

* cited by examiner

*Primary Examiner* — Cho Kwong
(74) *Attorney, Agent, or Firm* — Gavrilovich, Dodd & Lindsey LLP (57) ABSTRACT

Systems and methods are provided for automating the process of generating image metadata related to a vehicle and damage sustained by the vehicle during a collision event by using image analysis tools employing machine learning algorithms. The image with collision metadata renders the image capable of being analyzed using content-based searching.

12 Claims, 5 Drawing Sheets

METHODS FOR DETERMINING IMAGE CONTENT WHEN GENERATING A PROPERTY LOSS CLAIM THROUGH PREDICTIVE ANALYTICS

RELATED APPLICATIONS

This application claims the benefit of U.S. Provisional Application No. 62/904,976 filed on Sep. 24, 2019, the contents of which are incorporated herein by reference in its entirety.

TECHNICAL FIELD

The present disclosure is generally related to digital image metadata, and, more particularly, to automatically determining and associating metadata with image files.

BACKGROUND

With the proliferation of available image capture devices, electronic images have been a valuable tool in collision loss assessment, often resulting in large sets of image files related to a particular collision event. For example, image file may include captured information related to the damaged vehicle(s), parties, third-parties, such as bystanders or police, and repair process. Often, attempts are made to associate all of this information with a resulting electronic claim for the related loss. Because of the large number of images, it is critical to associate only relevant or those images which most accurately reflect the collision event.

Typical image files, in addition to image content data, include limited textual information in the form of metadata. This conventional metadata includes attribute tags or information describing the image according to various standards, for example the Exchangeable Image File Format (EXIF) standard. EXIF data is widely used by many digital cameras to embed technical metadata into image files they create. A primary feature of EXIF is its ability to record camera information in an image file at the point of capture. Some common data fields include the camera make and model, its serial number, the date and time of image capture, GPS coordinates of where image capture occurred, the shutter speed, the aperture, the lens used and the ISO speed setting. EXIF metadata can include other technical details, such as white balance and distance to the subject. However, most captured images lack any content tags or metadata, making it a challenge to employ techniques aimed at determining relevant images, which often utilize content-based or feature-based searching.

Accordingly, when an electronic claim is being processed for the related loss, insurance adjusters are faced with the challenge of efficiently and effectively sorting through and identifying a subset of images which are most relevant to assessing damage and/or the likely causality and relation of reported or treated injuries to the facts of loss in a collision event associated with a respective collision claim.

Currently available software tools that attempt process images captured during a collision event to identify most relevant images rely on metadata associated with the available images. Unfortunately, as noted above, often the available images lack the necessary metadata to effectively process. As a result, current process of using text-based metadata to identify relevant images is largely ineffective.

SUMMARY

In accordance with one or more embodiments, various features and functionality can be provided for generating image metadata based on image features related to a vehicle and the damage sustained by the vehicle during a collision event to facilitate assessing damage and/or the likely causality and relation of reported or treated injuries to the facts of loss in an electronic loss claim associated with the collision event.

In some embodiments, a method for generating collision metadata may execute a first machine learning model on electronic images associated with an electronic claim to assess and generate metadata on what is identified in each of the electronic images. For example, the electronic images associated with the electronic claim may be obtained from one or more image databases.

In some embodiments, the method may execute the first machine learning model on the electronic images associated with the electronic claim to assess and generate additional metadata when a vehicle is identified in any of the electronic images, on whether each of the obtained electronic images with the identified vehicle is illustrating an internal or external view of the identified vehicle, what one or more components of the identified vehicle are identified, and what is a percentage probability that each of the one or more identified components is damaged.

In some embodiments, the method may execute a second machine learning model to identify a subset of the electronic images associated with the electronic claim based on the generated metadata.

In some embodiments, the method may provide the identified subset of electronic images with the generated metadata to a client computing device to assess damage in the electronic claim. For example, the identified subset of electronic images with the generated metadata may include the identified subset of electronic images with the generated metadata to a client computing device to assess likely causality and relation of one or more reported or treated injuries to the damage in the electronic claim.

In some embodiments, the method may obtain feedback data on the subset of the electronic images from a client computing device; and utilizing, by the computing device, the obtained feedback data to train at least one of the first machine learning model or the second first machine learning model.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION

Described herein are systems and methods for determining image metadata related to damage sustained by a vehicle during a collision event to substantially facilitate assessing damage and/or the likely causality and relation of reported or treated injuries to the facts of loss in an electronic loss claim associated with the collision event. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

As alluded to above, various methods for search and retrieval of information, such as by a search engine over a network, typically employ text-based searching in which queried words or phrases are compared to an index or other data structure to identify documents, images, and the like that include matching or semantically similar textual content, metadata, file names, or other textual representations. While methods of text-based searching work relatively well for text-based documents, they are difficult to apply to image files and data. That is because, the relevant image content is not as readily searchable as associated textual data.

Embodiments of the disclosed technology provide a system and method for analyzing and processing obtained electronic images to determine image content metadata (i.e., metadata related to features or components which reflect damage sustained by a vehicle during a collision event). In particular, by virtue using machine learning algorithms allows the system to automate the assignment of metadata based on image feature analysis. Furthermore, the content metadata generated by the present system, is subsequently used to determine relevant images (i.e., images that include content comprising features which best reflect the damage or injuries) for association with an electronic loss claim resulting in a collision event.

Accordingly, as illustrated and described by way of the examples here, this technology creates an entirely new process that allows content-based or feature-based search of collision images to identify damage and/or the likely causality and relation of reported or treated injuries to the facts of loss in a collision even, thereby improving collision loss claim assessment.

The embodiments of presently disclosed technology employ two distinct machine learning models. In particular, a first machine learning model is used to generate metadata for the images that have been analyzed and determined to contain image features related to a particular object of interest (e.g., a motor vehicle damaged in a collision event). Additionally, metadata may be generated based on the image features related to a particular view of the object (e.g., an internal or external view of the vehicle). Next, metadata may be generated based on the image features related to particular component(s) of the object (e.g., a front bumper of the vehicle). Finally, the metadata may be generated based on a determination of a likelihood of damage associated with each identified component. Further, a second machine learning model may be used to identify and select a subset of electronic images relevant to an electronic claim based on the generated metadata by the first machine learning model.

Figure 1:
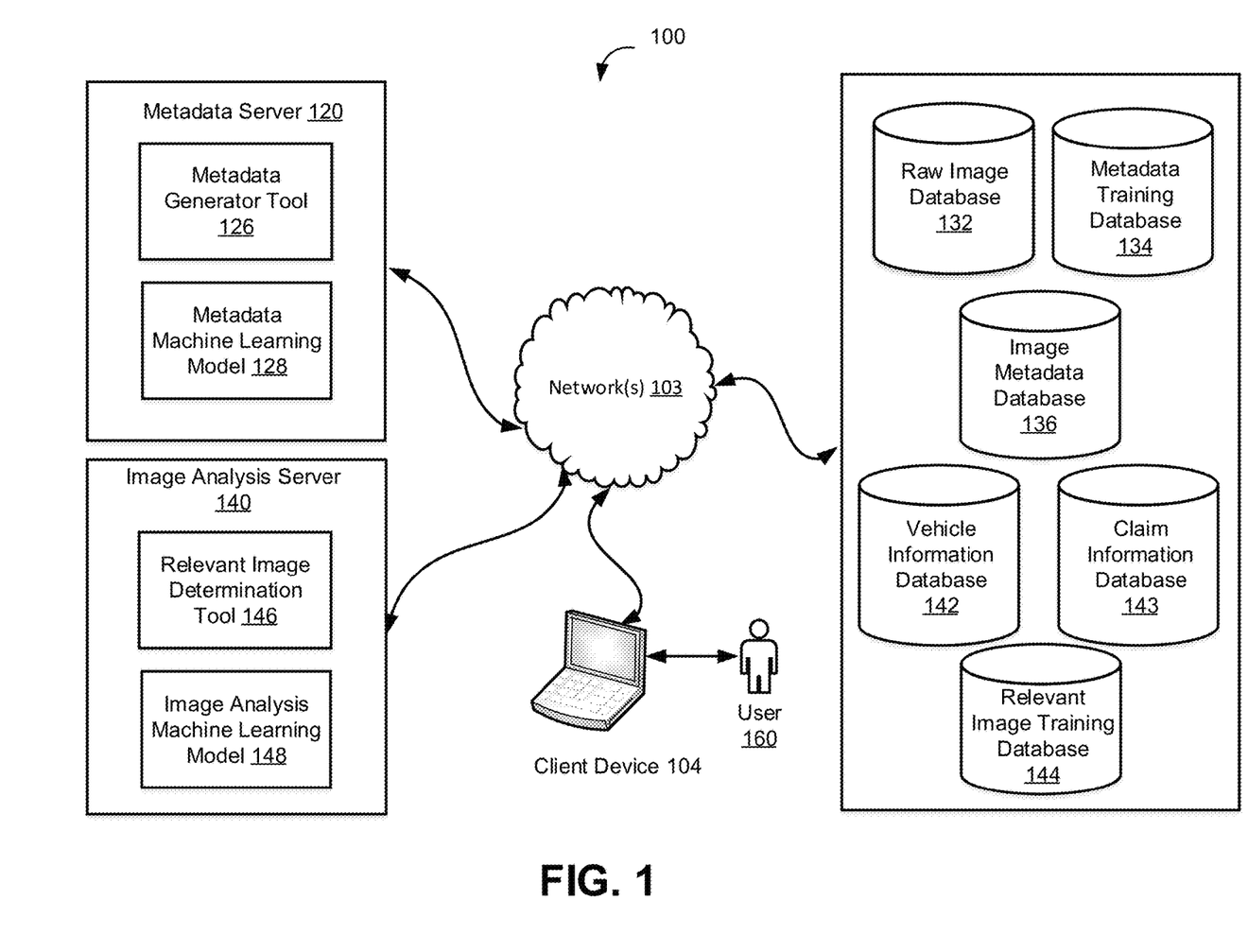
FIG. 1 illustrates an example image analysis system, according to an implementation of the disclosure.

FIG. 1 illustrates image analysis system 100 according to some embodiments of the disclosed technology. In some embodiments, system 100 may include a metadata server 120, an image analysis server 140, a network 103, a one or more user computing device(s) 104 (e.g., an insurance adjuster computing device) associated with one or more users 160 (e.g., an insurance adjuster). Additionally, system 100 may include other network devices such as one or more routers and/or switches.

In some embodiments, system 100 may include a raw image database 132, a metadata training database 134, an image metadata database 136, a vehicle information database 142, a claim information database 143, and relevant image training database 144 and/or other similar databases.

In some embodiments, user computing device(s) 104 may include a variety of electronic computing devices, for example, a smartphone, a tablet, a laptop, a display, a mobile phone, a computer wearable device, such as smart glasses, or any other head mounted display device, or a combination of any two or more of these data processing devices, and/or other devices. In some embodiments, user computing device(s) 104 may be used by insurance adjusters to interface with image analysis system 100 for the review of images identified by the system as relevant for a particular claim.

In some embodiments, metadata server 120 may include a processor, a memory, and network communication capabilities. In some embodiments, metadata server 120 may be a hardware server. In some implementations, metadata server 120 may be provided in a virtualized environment, e.g., metadata server 120 may be a virtual machine that is executed on a hardware server that may include one or more other virtual machines. Additionally, in one or more embodiments of this technology, virtual machine(s) running on metadata server 120 may be managed or supervised by a hypervisor. Metadata server 120 may be communicatively coupled to network 103.

In some embodiments, system 100 may employ one or more machine learning models, e.g., metadata machine learning model 128, which may execute on metadata server 120. Metadata machine learning model 128 may comprise one or more trained models or other instructions to assess a plurality of electronic images collected during a collision event. Metadata machine learning model 128 may be any machine learning mode, algorithm, or an Artificial Intelligence (AI) technique, capable of the functions described herein.

Figure 3:
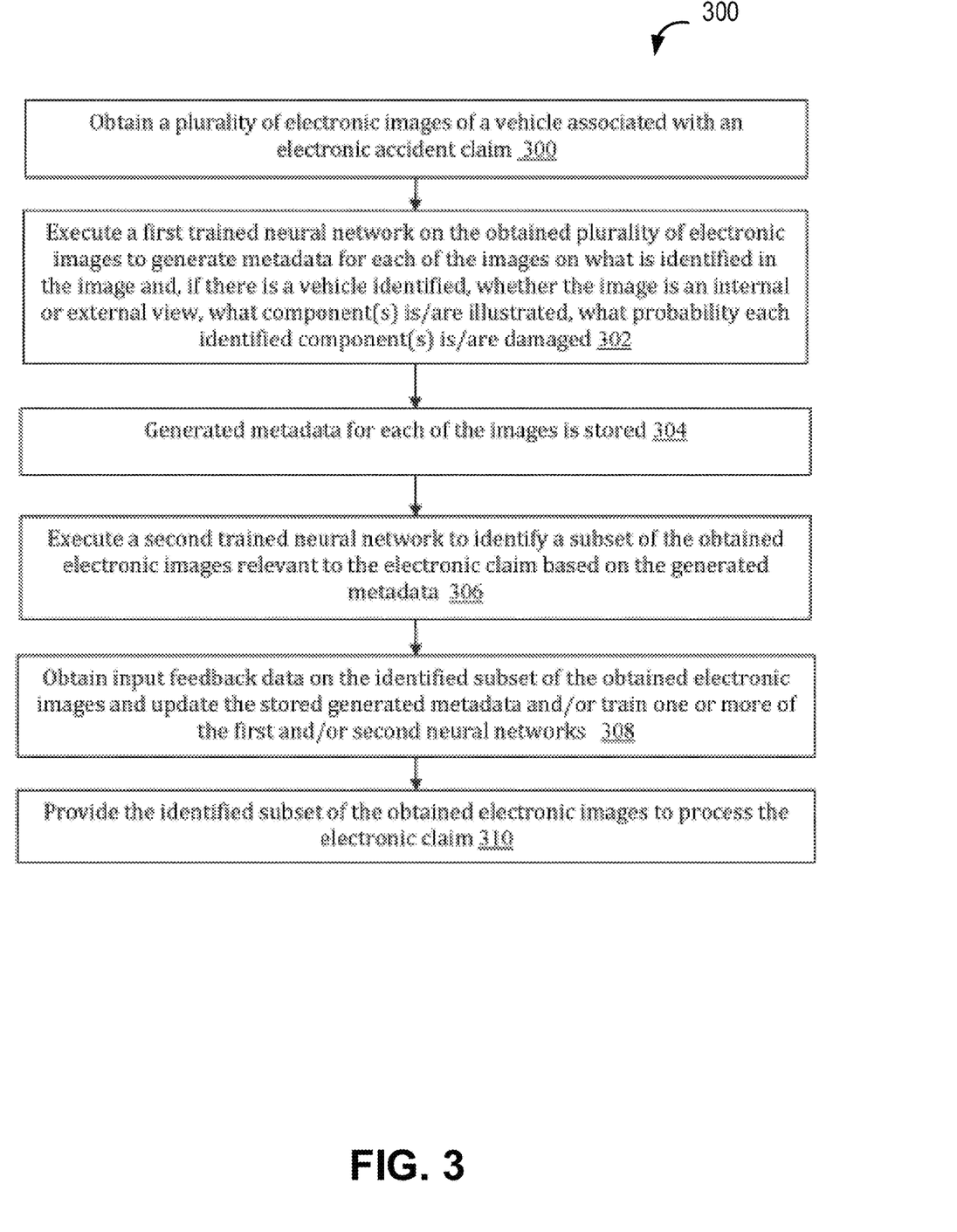
FIG. 3 illustrates an example process for analyzing an image, according to an implementation of the disclosure.

In some embodiments, the memory of metadata server 120 may store application(s) that can include executable instructions that, when executed by metadata server 120, cause metadata server 120 to perform actions or other operations as described and illustrated below with reference to FIGS. 3-4. For example, metadata server 120 may include an metadata generator tool 126 configured to utilize the trained machine learning model 128 comprising one or more trained models or other machine learning image analysis and metadata determination algorithms.

In some embodiments, metadata machine learning model 128 may be trained using images that have been identified as depicting a vehicle involved in a collision event. These images may depict one or more views of the vehicle (e.g., interior and exterior), one or more damaged components (e.g., front bumper). For example, metadata machine learning model 128 stored in the memory of metadata server 120 may be configured to obtain images that have been previously determined to be associated with a collision event (e.g., a motor vehicle accident). For example, specific data elements of the previously identified images may be applied as inputs to metadata machine learning model 128. Training machine learning model 128 may include supervised learning, unsupervised learning, or combinations thereof. During the training stage, metadata machine learning model 128 may be configured to store the values related to the decisions made during the training stage in a metadata training database 134.

In some embodiments, metadata machine learning model 128 may retrieve one or more stored images based on the obtained raw data or one or more other policies, rules or procedures and use one or more data preprocessing modules to, process the raw data for consistency with or without one or more of the stored scenarios.

Further, metadata machine learning model 128 may split the previously identified data into a training set of data, tune one or more parameters relating to making assignments using the training set of data. Finally, metadata machine learning model 128 may then train the metadata machine learning model 128 to comprise one or more trained models or other machine learning image recognition algorithms for analyzing the raw image data and determining relevant image features (e.g., damaged vehicle, interior and exterior views of a damaged vehicle, damaged component, and other relevant features) and used to determine whether the captured image associated with the collision event includes the same types of features. The images that have been analyzed and determined to contain features related to a damaged vehicle may be further processed to generate metadata that will be associated with the image, as described further in detail below. In other embodiments, the processing of the data may be executed separately from the training and/or other types of data may be used and/or other parameters may be tuned by train metadata machine learning model 128.

Metadata training database 134 may store training data of past identified images based on labeled examples of various vehicle view angles and components (e.g., right front bumper panel) and that may indicate whether each of those prior obtained electronic images of the vehicle is illustrating an internal or external view of the vehicle, what component(s) is/are illustrated, and what is the likelihood of damage associated with each identified component(s), and may be used to train the trained neural network module.

Raw image database 132 may store raw image data comprising a plurality of images associated with a collision event. As alluded to above, the captured images may be analyzed to determine whether a vehicle is depicted in the image, whether the vehicle has been damaged, and whether the damaged vehicle is identified with a collision event. Further, the images may be analyzed to determine whether the image illustrates an internal or external view of the identified vehicle, what component(s) is/are illustrated, and/or a likelihood that each identified component(s) is/are damaged. Finally, metadata may be generated for the identified vehicles, views, components, and likelihood of component damage determinations.

As alluded to earlier, trained metadata machine learning model 128 may analyze captured images to determine whether the image contains image features related to a particular object of interest (e.g., a motor vehicle damaged in a collision event). For example, captured content or data derived from the captured content (e.g., image feature data such as eigenvalues, machine readable data decoded from the image, etc.) may be used by trained machine learning model 128 to identify a vehicle. Alternatively, other image identification techniques may be used. Next, upon positively identifying at least one feature of the image as vehicle, vehicle identification information may be extracted from the image. For example, vehicle identification information may be processed to extract the VIN or license plate from the captured image data by utilizing stored optical character recognition programmed instructions.

In some embodiments, trained metadata machine learning model 128 may determine which particular view of the object (e.g., an internal or external view of the vehicle) is captured in the image. In some embodiments, trained metadata machine learning model 128 may determine which particular component(s) of the object (e.g., a front bumper of the vehicle) are captured in the image. Finally, the trained metadata machine learning model 128 may determine whether a likelihood that the identified component has sustained collision damage.

In some embodiments, trained metadata machine learning model 128 may perform likelihood of damage determination by utilizing a variety of analytical techniques to analyze previously identified images and raw images stored in raw image database 132, and/or other information, obtained from various sources to generate a damage indicator.

For example, trained metadata machine learning model 128 may utilize Bayesian-type statistical analysis to determine the damage indicator associated with individual component identified in the image. Damage indicator may be a quantified likelihood a particular comment may be damaged. That is, a calculated numerical value associated with damage indicator reflects a likelihood of the vehicle component being damaged. For example, a lower damage indicator may indicate that a component is not likely to be damaged.

In some implementations, damage indicator may be expressed based on a sliding scale of percentage values (e.g., 10%, 15%, . . . n, where a percentage reflects a likelihood of damage), as a numerical value (e.g., 1, 2, . . . n, where the magnitude of quantity reflects a likelihood of damage), or as text (e.g., "very low", "low", "medium", "high", "very high"), and other similar schemes used to represent damage indicator.

Other artificial intelligence techniques may be used instead of, or in addition to, using a machine learning model. By virtue of utilizing a machine learning approach enhances the metadata generation process described herein. In particular, by using machine learning model, allows the system to determine image content features which can then be used to generate metadata employed during relevant image selection or other content searches.

In some embodiments, metadata generator tool 126 may be generate metadata for images which have been identified by trained metadata machine learning model 128 to contain image features related to a particular object of interest (e.g., a motor vehicle damaged in a collision event).

In some embodiments, metadata generator tool 126 may be generate metadata for images which have been identified by trained metadata machine learning model 128 to contain image features related to a particular view of the object (e.g., an internal or external view of the vehicle).

In some embodiments, metadata generator tool 126 may be generate metadata for images which have been identified by trained metadata machine learning model 128 to contain image features related to particular component(s) of the object (e.g., a front bumper of the vehicle). Finally, in some embodiments, metadata generator tool 126 may be generate metadata for images which have been identified by trained metadata machine learning model 128 to contain image features indicating a determination of a likelihood of damage associated with each identified component. For example, metadata generator tool 126 may generate metadata corresponding to a damage indicator previously determined by trained metadata machine learning model 128, as described above.

In some embodiments, metadata generator tool 126 may utilize data stored in raw image database 132, training database 134, image metadata database 136, and/or other databases, as will be described in detail below. The image metadata database 136, may include one or more databases, which may store determined metadata associated with individual images. For example, metadata generator tool 126 may access raw image data database 132, training database 134, image metadata database 136 over a network 130 such as the Internet, via direct links, and the like.

In some embodiments, metadata system 100 may comprise an image analysis module and a metadata generator module. In some embodiments, metadata generator tool 126 may be implemented as one or more software packages executing on one or more metadata server 120 computers, respectively.

In some embodiments, metadata generator tool 126 may be a server application, a server module of a client-server application, or a distributed application. In some embodiments, metadata generator tool 126 may be implemented using a combination of hardware and software. The application(s) can be implemented as modules, engines, or components of other application(s). Further, the application(s) can be implemented as operating system extensions, module, plugins, or the like.

Even further, the application(s) may be operative locally on the device or in a cloud-based computing environment. The application(s) can be executed within or as virtual machine(s) or virtual server(s) that may be managed in a cloud-based computing environment. Also, the application(s), and even the mapping or analysis computing devices themselves, may be located in virtual server(s) running in a cloud-based computing environment rather than being tied to one or more specific physical network computing devices. Also, the application(s) may be running in one or more virtual machines (VMs) executing on the mapping and analysis computing devices.

In some embodiments, metadata server 120 may transmit and receive information to and from user computing device(s) 104, and/or other servers via network 103. For example, a communication interface of the metadata server 120 may be configured to operatively couple and communicate between raw image data database 132, training database 134, image metadata database 136, user computing device 104, which are all coupled together by the communication network(s) 103.

In some embodiments, metadata server 120 may be a standalone device or integrated with one or more other devices or apparatuses, such as one or more of the storage devices, for example. For example, metadata server 120 may include or be hosted by one of the storage devices, and other arrangements are also possible.

Figure 2:
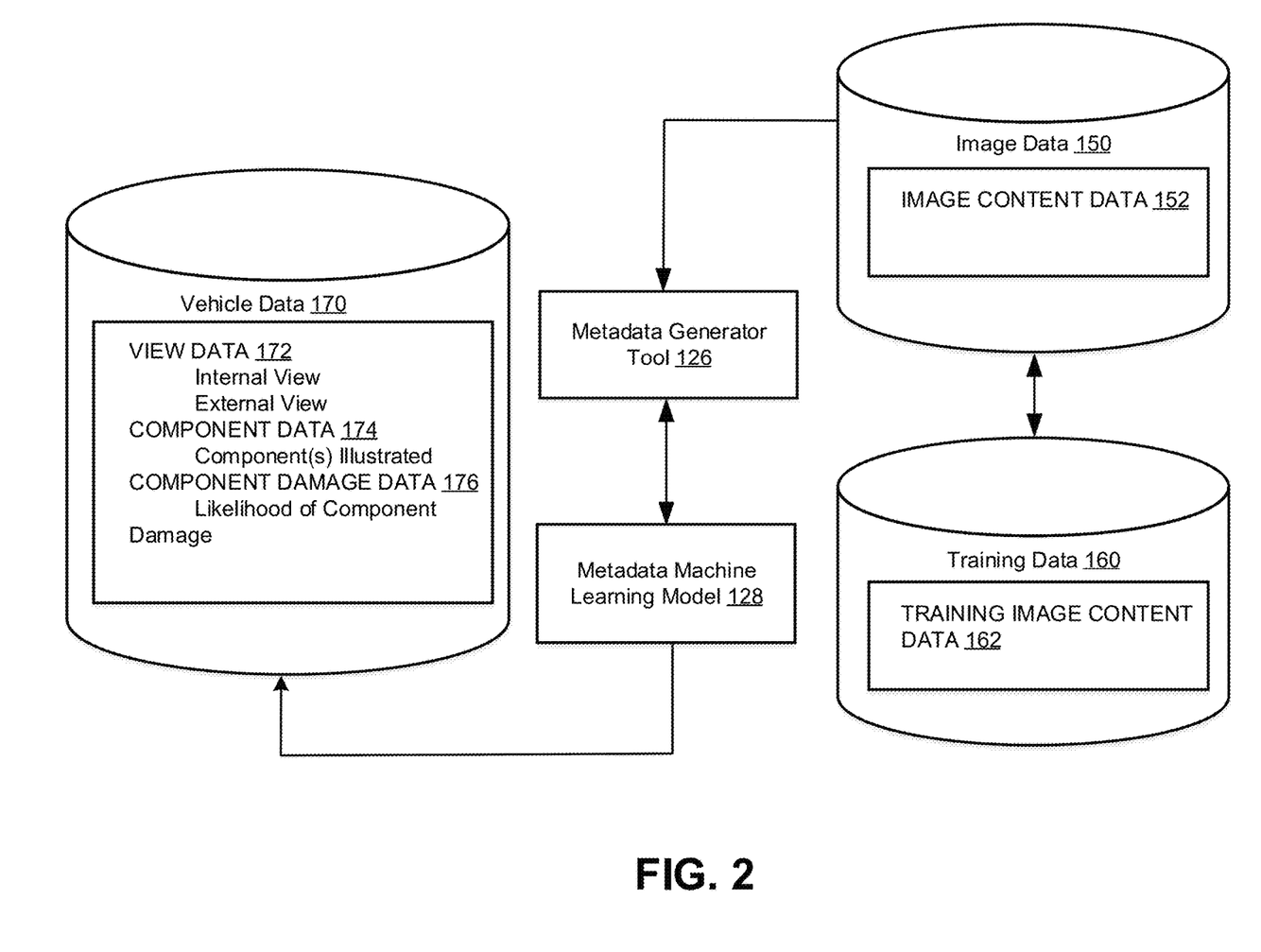
FIG. 2 illustrates example components of a metadata server, according to an implementation of the disclosure.

In some embodiments, as illustrated in FIG. 2, image metadata determination process performed by metadata generator tool 126 utilize may be configured to use image data 150 (e.g., raw image database 132 in FIG. 1) and training data 160 (e.g., metadata training database 134 in FIG. 1). For example, metadata generator tool 126 may generate metadata for images which have been determined by trained metadata machine learning model 128 to contain relevant data (e.g., stored as image data 150). For example, metadata stored in "view data" 172 of vehicle data 170 database may indicate whether the image depicts internal or external view, metadata stored in "component data" 174 may indicate which components are illustrated in the image, and metadata "component damage data" 176 may indicate a likelihood of component damage.

In some embodiments, system 100 may use relevant image determination tool 146 to determine most relevant images associated with a collision event based on the metadata generated by metadata generator tool 126. For example, image determination tool 146 may employ one or more machine learning models, e.g., image analysis machine learning model 148, which may execute on image analysis server 140. Image analysis machine learning model 148 may comprise one or more trained models or other instructions to determine most relevant images associated with a collision event based on the metadata generated by metadata generator tool 126. Image analysis machine learning model 148 may be any machine learning mode, algorithm, or an Artificial Intelligence (AI) technique, capable of the functions described herein.

In some embodiments, image analysis machine learning model 148 may be trained on a set of prior generated metadata based on whether or not the image of the vehicle component identified by the first machine learning model has been damaged or not (probability of damage). Images that are determined to indicate the highest probability of damage, such as images above a set or input threshold, for example, may be tagged or prioritized as having the highest likelihood for being relevant during an assessment by a user (e.g., an insurance adjuster).

In some embodiments, the trained image analysis machine learning model 148 stored in the memory of image analysis server 140 may be utilized by relevant image determination tool 146 configured to determine most relevant images associated with a collision event (e.g., a motor vehicle accident). The most relevant images may be a subset of all images related to a collision event and may depict the vehicle and damaged components that best illustrate the property damage. The image analysis machine learning model 148 may comprise one or more trained models or other instructions to identify a subset of obtained electronic images relevant to an electronic claim obtained from claim information database 143 based on the generated metadata stored in image metadata database 136, although the artificial intelligence engine may comprise other types and/or numbers of other neural networks or other artificial intelligence. The image metadata database 136 in this example may optionally store a part or all of the generated metadata associated with the identified one or more images relating to an electronic claim.

In some embodiments, image analysis server 140 may include any type of computing device that can be used to interface with metadata server 120 and/or metadata generator tool 126, raw data database 132, metadata training database 134 image metadata database 136, vehicle information database 142, claim information database 143, relevant image database 144, and client computing device 104. For example, image analysis server 140 may include a processor, a memory, and a communication interface, which are coupled together by a bus or other communication link, although other numbers and/or types of network devices could be used. In some embodiments, image analysis server 140 may include vehicle information database 142, claim information database 143, relevant image database 144, and other database(s).

In some embodiments, metadata server 120, image analysis server 140, and or other components may be a single device. Alternatively, a plurality of devices may be used. In some embodiments, metadata server 120 and image analysis server 140 may not be limited to a particular configuration. Thus, in some embodiments, metadata server 120 may contain a plurality of network devices that operate using a master/slave approach, whereby one of the network devices operate to manage and/or otherwise coordinate operations of the other network devices. Additionally, in some embodiments, metadata server 120 and image analysis server 140 may comprise different types of data at different locations.

In some embodiments, metadata server 120 and image analysis server 140 may operate as a plurality of network devices within a cluster architecture, a peer-to-peer architecture, virtual machines, or within a cloud architecture, for example. Thus, the technology disclosed herein is not to be construed as being limited to a single environment and other configurations and architectures are also envisaged.

Although the exemplary system 100 with user computing device(s) 104, metadata server 120, image analysis server 140, and network(s) 103 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment, such as user computing device(s) 104, metadata server 120 and image analysis server 140 may be configured to operate as virtual instances on the same physical machine. In other words, one or more of user computing device(s) 104, metadata server 120 and image analysis server 140 may operate on the same physical device rather than as separate devices communicating through communication network(s).

In addition, two or more computing systems or devices can be substituted for any one of the systems or devices, in any example set forth herein. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including, by way of example, wireless networks, cellular networks, PDNs, the Internet, intranets, and combinations thereof.

By virtue of automatically analyzing and processing obtained electronic images, allows the system to facilitate assessing damage and/or the likely causality and relation of reported or treated injuries to the facts of loss in a motor vehicle accident in an associated electronic claim. For example, FIG. 3 illustrates a process 300 for analyzing images, generating metadata, and identifying relevant images according to some embodiments of the disclosed technology.

The process 300 may begin in step 300 by the obtaining raw image comprising a plurality of electronic images associated with an electronic claim for a motor vehicle accident, in this example, from one or more sources, such as raw image database 132 illustrated in FIG. 1, vehicle data for the vehicle associated with the electronic claim from one or more sources, such as the vehicle information database 142, illustrated in FIG. 1, and/or claim data for the electronic claim from one or more sources, such as claim information database 143.

Figure 4:
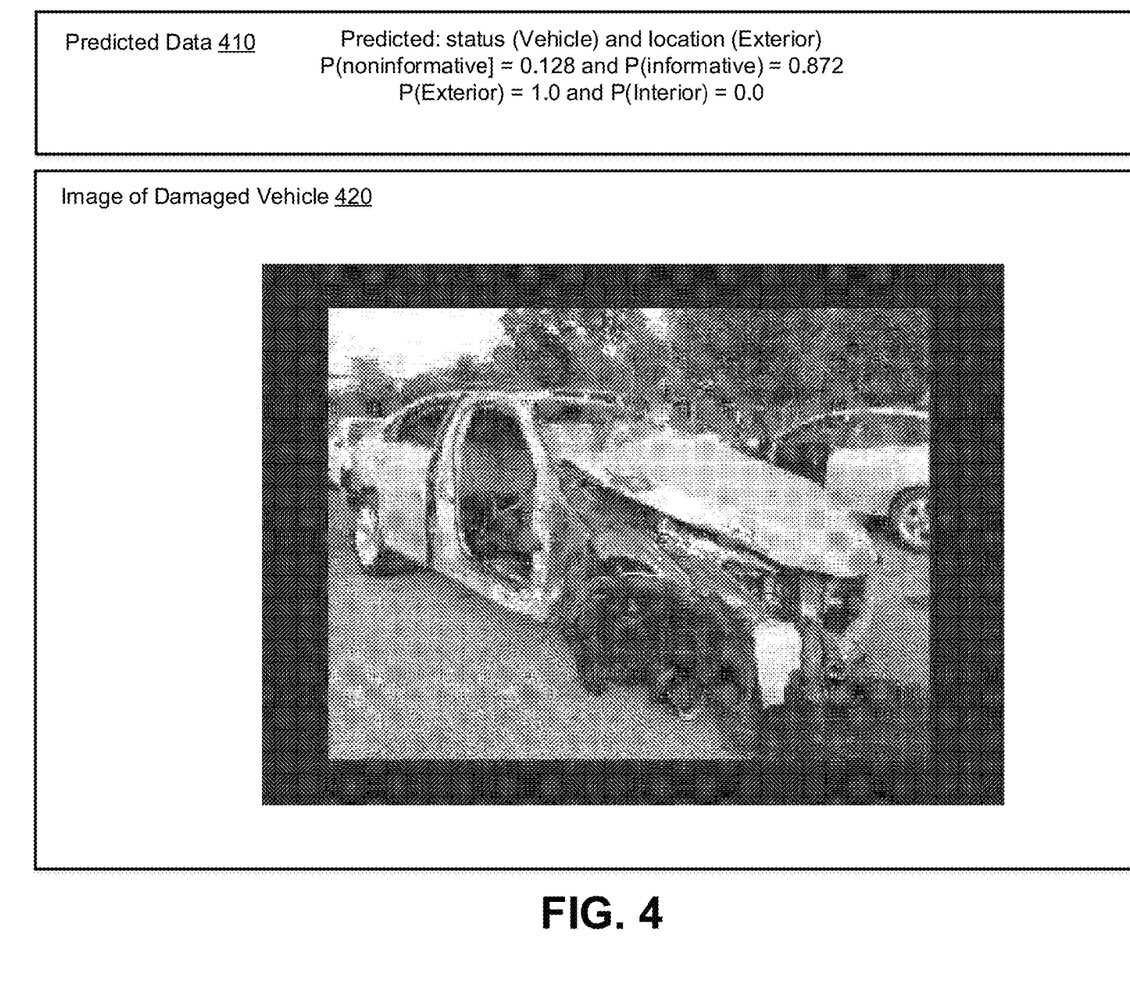
FIG. 4 illustrates example output of an image analysis process, according to an implementation of the disclosure.

For example, as illustrated in FIG. 4, an electronic image 420 related to an electronic claim for a motor vehicle accident may be obtained. As noted earlier, the obtained electronic images associated with an electronic claim to be processed may have missing and/or incomplete metadata for purposes of assessing damage and/or likely causality and relation of reported or treated injuries to the facts of loss in a motor vehicle accident. An output of process 300 illustrated in FIG. 3, it may include predictive data 410 comprising of at least an indicator existence of a vehicle in the image, interior or exterior view of the vehicle, and scores for each output, and scores for whether this image is informative in predicting injury.

Referring back to FIG. 3, in step 302, metadata machine learning model 128 illustrated in FIG. 1 may be executed on the obtained images in step 300 and may also use the obtained vehicle data and claim data to assess and generate metadata for each of the obtained plurality of electronic images and, if a vehicle is identified in any of the obtained electronic images, on whether each of those obtained electronic images of the vehicle is illustrating an internal or external view of the vehicle, what component(s) is/are illustrated, and what is the percentage probability that each identified component(s) is/are damaged. For example, metadata machine learning model 128 may be trained on a set of prior processed obtained images based on labeled examples of various vehicle view angles and components (e.g. right front quarter panel) and that may indicate whether each of those prior obtained electronic images of the vehicle is illustrating an internal or external view of the vehicle, what component(s) is/are illustrated, and what is the percentage probability that each identified component(s) is/are damaged.

In step 304, image machine learning model 128 illustrated in FIG. 1 may be executed on the generated metadata for the obtained plurality of electronic images on what is identified in each of the obtained electronic images, and, if a vehicle is identified in any of the obtained electronic images, on whether each of those obtained electronic images of the vehicle is illustrating an internal or external view of the vehicle, what component(s) is/are illustrated, and what is the percentage probability that each identified component(s) is/are damaged may be stored in image metadata database 136.

In step 306, image analysis machine learning model 148 of image analysis server 140 illustrated in FIG. 1 may be executed to identify a subset of obtained electronic images relevant to an electronic claim obtained from claim information database 143 based on the generated metadata, although other types of information and/or other data may be used, such as the obtained vehicle data and/or the claim data associated with the electronic claim by way of example only. For example, image analysis machine learning model 148 may be trained on a set of prior generated metadata based on whether or not the image of the vehicle component identified by the first machine learning model has been damaged or not (likelihood of damage). For example, images that are determined by metadata machine learning model 128 to indicate the highest probability of damage, such as images above a set or input threshold, for example, would be prioritized the highest for potential assessment by user 160 (e.g., an adjuster) operating user computing device 104, illustrated in FIG. 1.

In step 308, image analysis server 140 may obtain feedback data from user computing device 104 on the identified subset of the obtained plurality of electronic images for the electronic claim. The obtained feedback data may be used by image analysis machine learning model 148 to further train or otherwise refine the metadata machine learning model 128 and/or image analysis machine learning model 148 and/or to adjust the stored metadata for one or more of the electronic images.

Figure 5:
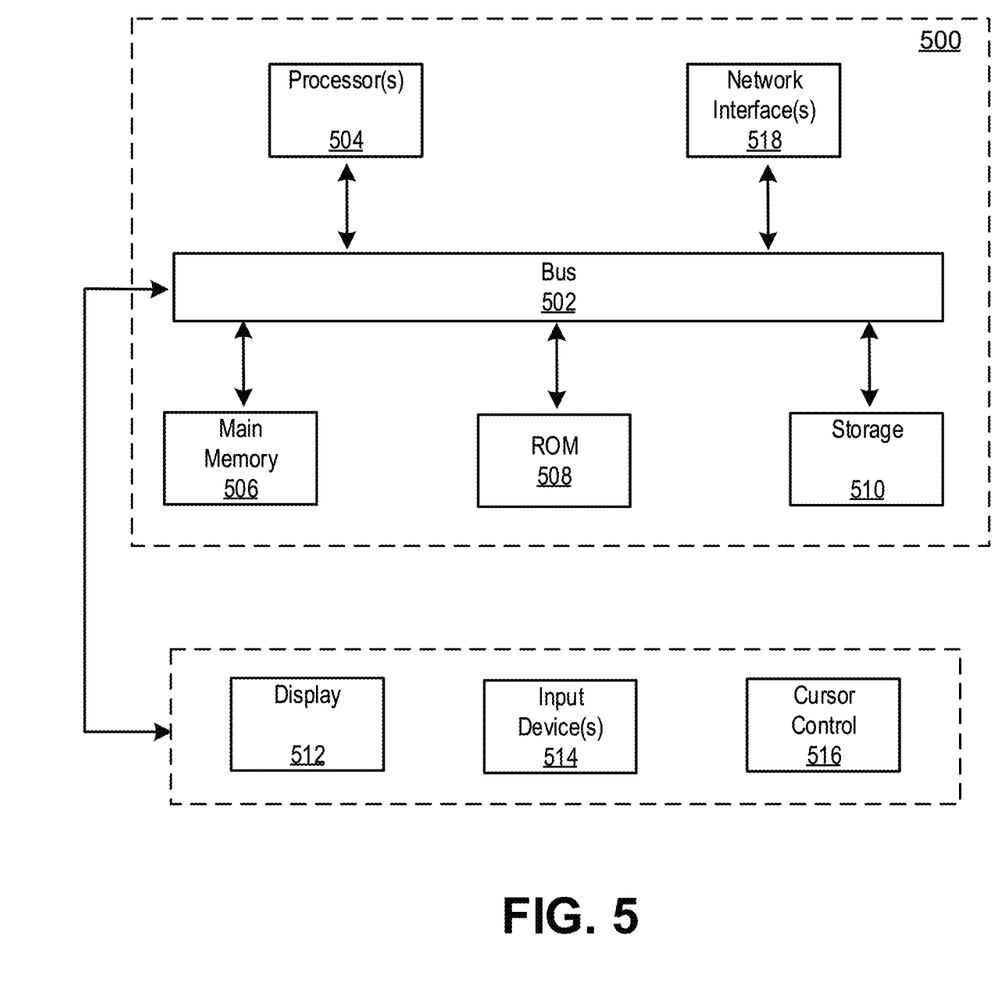
FIG. 5 illustrates an example computing system that may be used in implementing various features of embodiments of the disclosed technology.

In step 310, relevant image determination tool 146 of image analysis server 140 illustrated in FIG. 1 may provide the identified subset of one or more electronic images with the generated metadata to user computing device 104 to assess damage and/or the likely causality and relation of reported or treated injuries to the facts of loss in a motor vehicle accident in the associated electronic claim.

Where circuits are implemented in whole or in part using software, in one embodiment, these software elements can be implemented to operate with a computing or processing system capable of carrying out the functionality described with respect thereto. One such example computing system is shown in FIG. 5. Various embodiments are described in terms of this example-computing system 500. After reading this description, it will become apparent to a person skilled in the relevant art how to implement the technology using other computing systems or architectures.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors and/or specialized graphical processors.

The computer system 500 also includes a main memory 505, such as a random access memory (RAM), cache and/or other dynamic storage devices, coupled to bus 502 for storing information and instructions to be executed by processor 504. Main memory 505 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such a SSD, magnetic disk, optical disk, or USB thumb drive (Flash drive), etc., is provided and coupled to bus 502 for storing information and instructions.

The computer system 500 may be coupled via bus 502 to a display 512, such as a transparent heads-up display (HUD) or an optical head-mounted display (OHMD), for displaying information to a computer user. An input device 514, including a microphone, is coupled to bus 502 for communicating information and command selections to processor 504. An output device 516, including a speaker, is coupled to bus 502 for communicating instructions and messages to processor 504.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, boy Java, Java, C or C++. A software component may be compiled and linked into an executable program, installed in a dynamic link library, or may be written in an interpreted programming language such as, for example, BASIC, Perl, or Python. Components may also be written in a database language such as SQL and/or handled via a database object such as a trigger or a constraint. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 505. Such instructions may be read into main memory 505 from another storage medium, such as storage device 510. Execution of the sequences of instructions contained in main memory 505 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 505. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire, and fiber optics, including the wires that comprise bus 502. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   obtaining, by a computing device, electronic images of a damaged vehicle associated with an electronic loss claim;
   obtaining, by the computing device, electronic images of previously-identified damaged vehicles, wherein the electronic images of previously-identified damaged vehicles are obtained from one or more image databases, and wherein the electronic images of previously-identified damaged vehicles have been identified as depicting damaged vehicles involved in collision events;
   generating, by a metadata machine learning model of the computing device, a first training data set comprising the electronic images of previously-identified damaged vehicles;
   training, by the metadata machine learning model of the computing device, a first machine learning model using the first training data set;
   executing, by the computing device, the first machine learning model on the electronic image of the damaged vehicle associated with the electronic loss claim to generate metadata of image features present in the electronic image of the damaged vehicle, wherein the generated metadata of image features includes a same type of feature as the electronic images of previously-identified damaged vehicles, and wherein the same type of feature is a vehicle component;
   using the metadata machine learning model of the computing device, applying a Bayesian-type statistical analysis to determine a damage indicator associated with the component identified in the electronic images of the damaged vehicle associated with the electronic loss claim, wherein the damage indicator is associated with a percentage probability that the vehicle component is damaged;
   updating the generated metadata with the damage indicator determined by the Bayesian-type statistical analysis;
   using an image analysis machine learning model of the computing device at a first time, training a second machine learning model using the generated metadata;
   executing, by the computing device, the second machine learning model to identify a subset of the electronic images associated with the electronic loss claim based on the percentage probabilities that the vehicle component is damaged;
   providing, by the computing device, the subset of electronic images with the generated metadata to a client computing device to assess damage to the damaged vehicle for the electronic loss claim;
   obtaining, by the computing device, feedback data on the identified subset of the electronic images from the client computing device; and
   using the image analysis machine learning model of the computing device at a second time after the first time, training and refining the second machine learning model using the feedback data.

2. The method of claim 1, wherein the providing the subset of electronic images with the generated metadata comprises:
   providing, by the computing device, the subset of electronic images with the generated metadata to the client computing device to assess likely causality and relation of one or more reported or treated injuries to the damage in the electronic loss claim.

3. A system for providing image assessment, the system comprising one or more physical processors configured by machine-readable instructions to:
   obtain electronic images of a damaged vehicle associated with an electronic loss claim;
   obtain electronic images of previously-identified damaged vehicles, wherein the electronic images of previously-identified damaged vehicles are obtained from one or more image databases, and wherein the electronic images of previously-identified damaged vehicles have been identified as depicting damaged vehicles involved in collision events;

generate, by a metadata machine learning model of the computing device, a first training data set comprising the electronic images of previously-identified damaged vehicles;

train, by the metadata machine learning model of the computing device, a first machine learning model using the first training data set;

execute the first machine learning model on the electronic image of the damaged vehicle associated with the electronic loss claim to generate metadata describing what is identified in the electronic images, wherein the generated metadata of image features present in the electronic image of the damaged vehicle, wherein the generated metadata of image features includes a same type of feature as the electronic images of previously-identified damaged vehicles, and wherein the same type of feature is a vehicle component;

using the metadata machine learning model, apply a Bayesian-type statistical analysis to determine a damage indicator associated with the component identified in the electronic images of the damaged vehicle associated with the electronic loss claim, wherein the damage indicator is associated with a percentage probability that the vehicle component is damaged;

update the generated metadata with the damage indicator determined by the Bayesian-type statistical analysis;

using an image analysis machine learning model at a first time, train a second machine learning model using the generated metadata;

execute the second machine learning model to identify a subset of the electronic images associated with the electronic loss claim based on the percentage probabilities that the vehicle component is damaged;

provide the subset of electronic images with the generated metadata to a client computing device to assess damage to the damaged vehicle for the electronic loss claim;

obtain, by the computing device, feedback data on the identified subset of the electronic images from the client computing device; and using the image analysis machine learning model at a second time after the first time, train and refine the second machine learning model using the feedback data.

4. The system of claim 3, wherein the providing the subset of electronic images with the generated metadata comprises providing the subset of electronic images with the generated metadata to the client computing device to assess likely causality and relation of one or more reported or treated injuries to the damage in the electronic loss claim.

5. A non-transitory machine readable medium having stored thereon instructions comprising executable code which when executed by one or more processors, causes the one or more processors to:

obtain electronic images of a damaged vehicle associated with an electronic loss claim;

obtain electronic images of previously-identified damaged vehicles, wherein the electronic images of previously-identified damaged vehicles are obtained from one or more image databases, and wherein the electronic images of previously-identified damaged vehicles have been identified as depicting damaged vehicles involved in collision events;

generate, by a metadata machine learning model of the computing device, a first training data set comprising the electronic images of previously-identified damaged vehicles;

train, by the metadata machine learning model of the computing device, a first machine learning model using the first training data set;

execute the first machine learning model on the electronic image of the damaged vehicle associated with the electronic loss claim to generate metadata of image features present in the electronic image of the damaged vehicle, wherein the generated metadata of image features includes a same type of feature as the electronic images of previously-identified damaged vehicles, and wherein the same type of feature is a vehicle component;

using the metadata machine learning model, apply a Bayesian-type statistical analysis to determine a damage indicator associated with the component identified in the electronic images of the damaged vehicle associated with the electronic loss claim, wherein the damage indicator is associated with a percentage probability that the vehicle component is damaged;

update the generated metadata with the damage indicator determined by the Bayesian-type statistical analysis;

using an image analysis machine learning model at a first time, train a second machine learning model using the generated metadata;

execute the second machine learning model to identify a subset of the electronic images associated with the electronic loss claim based on the percentage probabilities that the vehicle component is damaged;

provide the subset of electronic images with the generated metadata to a client computing device to assess damage to the damaged vehicle for the electronic loss claim;

obtain feedback data on the identified subset of the electronic images from the client computing device; and using the image analysis machine learning model at a second time after the first time, train and refine the second machine learning model using the feedback data.

6. The non-transitory machine readable medium of claim 5, wherein the providing the subset of electronic images with the generated metadata comprises providing the subset of electronic images with the generated metadata to the client computing device to assess likely causality and relation of one or more reported or treated injuries to the damage in the electronic loss claim.

7. An assessment computing device, comprising memory including programmed instructions stored thereon and one or more processors configured to be capable of executing the stored programmed instructions to:

obtain electronic images of a damaged vehicle associated with an electronic loss claim;

obtain electronic images of previously-identified damaged vehicles, wherein the electronic images of previously-identified damaged vehicles are obtained from one or more image databases, and wherein the electronic images of previously-identified damaged vehicles have been identified as depicting damaged vehicles involved in collision events;

generate, by a metadata machine learning model of the computing device, a first training data set comprising the electronic images of previously-identified damaged vehicles;

train, by the metadata machine learning model, a first machine learning model using the first training data set;

execute the first machine learning model on the electronic image of the damaged vehicle associated with the electronic loss claim to generate metadata of image features present in the electronic image of the damaged vehicle, wherein the generated metadata of image features includes a same type of feature as the electronic images of previously-identified damaged vehicles, and wherein the same type of feature is a vehicle component;

using the metadata machine learning model, apply a Bayesian-type statistical analysis to determine a damage indicator associated with the component identified in the electronic images of the damaged vehicle associated with the electronic loss claim, wherein the damage indicator is associated with a percentage probability that the vehicle component is damaged;

update the generated metadata with the damage indicator determined by the Bayesian-type statistical analysis;

using an image analysis machine learning model at a first time, train a second machine learning model using the generated metadata;

execute the second machine learning model to identify a subset of the electronic images associated with the electronic loss claim based on the percentage probabilities that the vehicle component is damaged;

provide the subset of electronic images with the generated metadata to a client computing device to assess damage to the damaged vehicle for the electronic loss claim;

obtain feedback data on the identified subset of the electronic images from the client computing device; and using the image analysis machine learning model of the computing device at a second time after the first time, train and refine the second machine learning model using the feedback data.

8. The assessment computing device of claim 7, wherein the providing the subset of electronic images with the generated metadata comprises providing the subset of electronic images with the generated metadata to the client computing device to assess likely causality and relation of one or more reported or treated injuries to the damage in the electronic loss claim.

9. The method of claim 1, wherein the electronic images of the damaged vehicle associated with the electronic loss claim include an image of a front bumper of the damaged vehicle.

10. The method of claim 1, wherein the electronic images of the damaged vehicle associated with the electronic loss claim include an image of an internal view of the damaged vehicle.

11. The method of claim 1, wherein the damage indicator associated with the component identified in the electronic images of the damaged vehicle associated with the electronic loss claim is expressed as a sliding scale of percentage values.

12. The method of claim 1, wherein the damage indicator associated with the component identified in the electronic images of the damaged vehicle associated with the electronic loss claim is expressed as a numerical value where a magnitude of quantity reflects a likelihood of damage.

* * * * *